US012705132B2

(12) United States Patent
Yogev et al.

(10) Patent No.: US 12,705,132 B2
(45) Date of Patent: Aug. 11, 2026

(54) NON-VOLATILE MEMORY METADATA PROTECTION

(71) Applicant: Infineon Technologies LLC, San Jose, CA (US)

(72) Inventors: Yoav Yogev, Mazkeret-Batya (IL); Amichai Givant, Rosh-Ha'ain (IL); Zhizheng Liu, San Jose, CA (US)

(73) Assignee: Infineon Technologies LLC, San Jose, CA (US)

( * ) Notice: Subject to any disclaimer, the term of this patent is extended or adjusted under 35 U.S.C. 154(b) by 25 days.

(21) Appl. No.: 18/733,037

(22) Filed: Jun. 4, 2024

(65) Prior Publication Data

US 2025/0370858 A1 Dec. 4, 2025

(51) Int. Cl.
*G06F 11/00* (2006.01)
*G06F 11/10* (2006.01)

(52) U.S. Cl.
CPC ................................ *G06F 11/1044* (2013.01)

(58) Field of Classification Search
CPC .......... G06F 11/44; G06F 11/10; G06F 11/20; G06F 11/30
See application file for complete search history.

(56) References Cited

U.S. PATENT DOCUMENTS 5,953,378 A * 9/1999 Hotani .................... H04L 7/048 714/794
8,699,278 B2 * 4/2014 Nishiyama ............ G11C 16/06 365/189.05
9,729,231 B2 * 8/2017 Kim ...................... H04L 1/0036
10,613,932 B2 * 4/2020 Hsu ....................... H03M 13/00
10,656,847 B2 * 5/2020 Pletka .................... G11C 29/52
11,869,598 B2 * 1/2024 Lee ........................ G11C 16/30
2006/0200728 A1 9/2006 Nagai et al.
2012/0030539 A1 2/2012 Graef et al.
2020/0295783 A1 9/2020 Berman et al.
2023/0137469 A1 5/2023 Givant et al.
2023/0223961 A1 7/2023 Mccrate et al.

OTHER PUBLICATIONS

International Search Report and Written Opinion of the International Searching Authority for International Application No. PCT/US25/30059 dated Sep. 8, 2025; 13 pages.

* cited by examiner

*Primary Examiner* — Esaw T Abraham

(57) ABSTRACT

A method of operating a non-volatile memory (NVM) device includes: reading, by a memory controller of the NVM device, first metadata bits and first redundant bits stored in an erase sector of a memory cell array of the NVM device, where the first redundant bits are generated using an error-correction code (ECC) for protection of the first metadata bits; and performing an ECC decoding process for the first metadata bits, which includes: forming a first data frame by filling the first data frame with the first metadata bits, a first number of dummy bits, and the first redundant bits; computing, by the memory controller, a syndrome vector for the first data frame in accordance with the error-correction code; and in response to determining that the syndrome vector comprises a non-zero element, performing, by the memory controller, error correction for the first data frame to obtain decoded first metadata bits.

8 Claims, 11 Drawing Sheets

210
EPLI (22)
counter (24)

210
EPLI (22)
counter (24)
all '1's

220
EPLI (22)
counter (24)
all '1's
ECC (9)

310
1
2
3
...
11
12
13
14
15
16
56
57
58
EPLI (13)
all '1's 320
59
60
61
62
63
64
ECC (6)

NON-VOLATILE MEMORY METADATA PROTECTION

TECHNICAL FIELD

The present invention relates generally to an electronic system and method, and, in particular embodiments, to a system and method for protecting the metadata of a non-volatile memory device.

BACKGROUND

Programmable non-volatile memories (NVM) are useful in many applications because they retain stored information even when power is removed from the memory. There are many different types of programmable non-volatile memory including, but not limited to, programmable read only memory (PROM), electrically erasable ROM (EEPROM) and Flash memory. These memory types have several methods of charge storage including, but not limited to, placing charge on a Floating Gate or Charge Trapping (CT) storage material or node. Like other types of memory, programmable NVMs are usually constructed as an array of bit cells (also referred to as memory cells) arranged in rows and columns. Each bit cell may include one, split gate, or two transistors (e.g., 1T, 1.5T, or 2T cells). During programming, charge is injected into the storage node of one of the transistors. During normal operation of the NVM, bit cells are read by selecting a row of bit cells via a word line (WL) and measuring output currents of each bit cell via sense amplifiers coupled to bit lines (BLs).

For some NVM devices (e.g., flash memory devices), the memory cell array is divided into many erase sectors, and all memory cells within the same erase sector are erased by a same erase operation. Each erase sector may include its own metadata, which includes critical system information and/or operation information of the erase sector. Currently, there is no simple and reliable way to protect the metadata of each erase sector with negligible area cost. There is a need in the art for simple, reliable, and cost effective ways to protect the metadata.

SUMMARY

In accordance with an embodiment, a method of operating a non-volatile memory (NVM) device includes: reading, by a memory controller of the NVM device, first metadata bits and first redundant bits stored in an erase sector of a memory cell array of the NVM device, wherein the first redundant bits are generated using an error-correction code (ECC) for protection of the first metadata bits; and performing an ECC decoding process for the first metadata bits, comprising: forming a first data frame by filling the first data frame with the first metadata bits, a first number of dummy bits, and the first redundant bits; computing, by the memory controller, a syndrome vector for the first data frame in accordance with the error-correction code; and in response to determining that the syndrome vector comprises a non-zero element, performing, by the memory controller, error correction for the first data frame to obtain decoded first metadata bits.

In accordance with an embodiment, a method of operating a non-volatile memory (NVM) device includes encoding, by a memory controller of the NVM device, first metadata bits for an erase sector of a memory cell array of the NVM device, comprising: forming a first data frame by filling the first data frame with the first metadata bits and a first number of dummy bits; and encoding the first data frame using a systematic error-correction code (ECC), wherein encoding the first data frame generates a first code word that includes the first data frame and first redundant bits for the first data frame. The method further includes writing, by the memory controller, the first metadata bits and the first redundant bits in the erase sector of the memory cell array.

In accordance with an embodiment, a non-volatile memory (NVM) device includes: a memory cell array comprising a plurality of erase sectors, wherein each erase sector of the plurality of erase sectors is configured to store data bits and metadata bits of the each erase sector; an array access circuit coupled to the memory cell array and configured to perform read or write operations on the memory cell array; and a memory controller coupled to the memory cell array and the array access circuit, wherein the memory controller is configured to: encode first metadata bits for a first erase sector of the memory cell array by: forming a first data frame by filling the first data frame with the first metadata bits and a first number of dummy bits; and encoding the first data frame using a systematic error-correction code (ECC), wherein encoding the first data frame generates a first code word that includes the first data frame and first redundant bits for the first data frame; and write the first metadata bits and the first redundant bits in the first erase sector of the memory cell array.

BRIEF DESCRIPTION OF THE DRAWINGS

For a more complete understanding of the present invention, and the advantages thereof, reference is now made to the following description taken in conjunction with the accompanying drawings, in which.

Corresponding numerals and symbols in different figures generally refer to corresponding parts unless otherwise indicated. The figures are drawn to clearly illustrate the relevant aspects of the preferred embodiments and are not necessarily drawn to scale. To more clearly illustrate certain embodiments, a letter indicating variations of the same structure, material, or process step may follow a figure number.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

Figure 1:
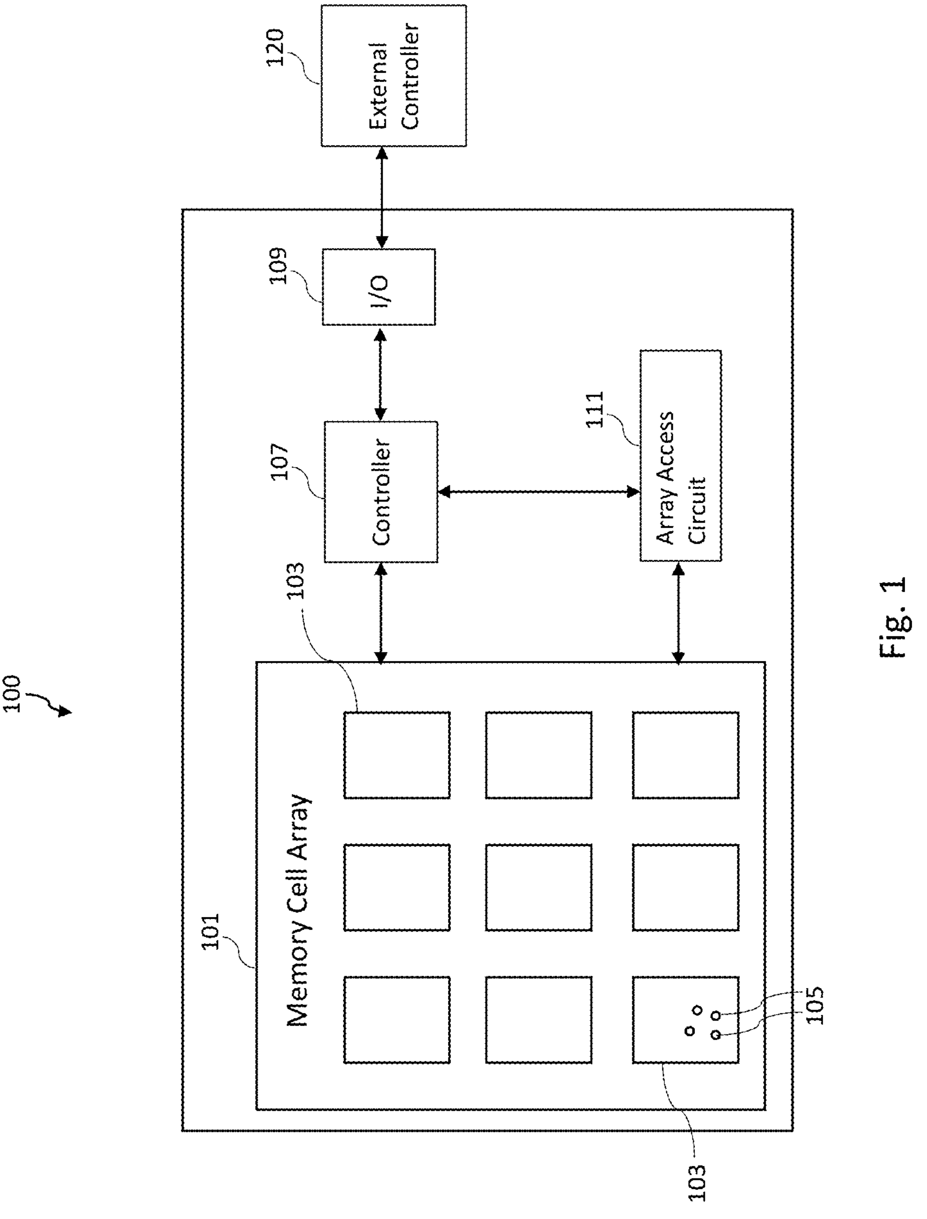
FIG. 1 illustrates a block diagram of a non-volatile memory (NVM) device, in an embodiment.

FIG. 1 illustrates a block diagram of a non-volatile memory (NVM) device 100, in an embodiment. Note that for simplicity, not all features of the NVM device 100 are illustrated in FIG. 1. The NVM device 100 may be, e.g., a PROM device, an EPROM device, a flash memory device, or the like. FIG. 1 further illustrates an external controller 120 which is coupled to the NVM device 100 and accesses (e.g., reads and/or writes) the NVM device 100. The external controller 120 is shown to illustrate the interaction between the NVM device 100 and an external device. The external controller 120 is not part of the NVM device 100, in the illustrated embodiment.

As illustrated in FIG. 1, the NVM device 100 includes a memory cell array 101, a controller 107 (also referred to as a memory controller 107), an array access circuit 11, and an Input/Output (I/O) circuit 109. The NVM device 100 may be implemented as one or more integrated circuits (ICs). For example, one or more functional blocks of the NVM device 100 in FIG. 1 may be integrated on a semiconductor substrate (e.g., silicon) to form an integrated circuit (IC) device or part of an IC device.

Figure 2B:
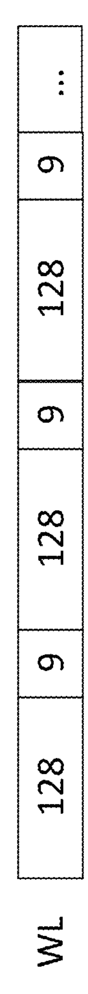
FIG. 2B illustrates logical arrangement of memory cells for storing error-correction coding protected data in a memory cell array, in an embodiment.
Figure 2A:
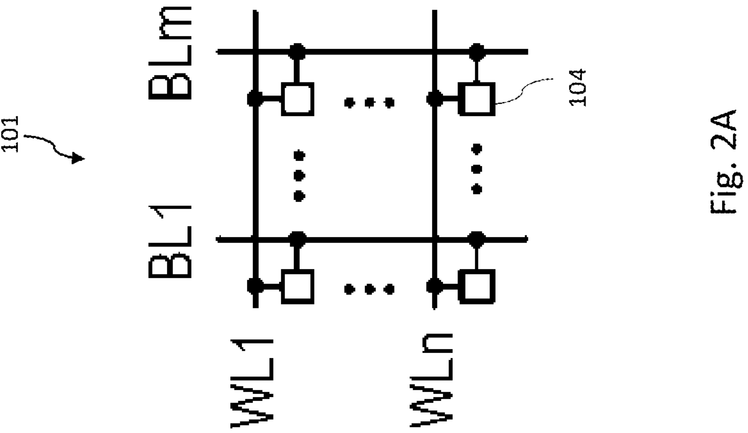
FIG. 2A illustrates a memory cell array of an NVM device, in an embodiment.

In FIG. 1, the memory cell array 101 includes memory cells 104 (see FIG. 2A) organized in an array format, e.g., in rows and columns. Referring temporarily to FIG. 2A, the memory cell array 101 includes word lines (WLs) denoted as WL1, WL2, . . . , WLn, and includes bit lines (BLs) denoted as BL1, BL2, . . . , BLm. Each memory cell 104 is coupled to a respective WL and a respective BL, and may be addressed by applying appropriate voltages on the respective WL and BL. Each memory cell 104 may be used to store 1 or more bits of digital information, depending on the structure of the memory cell 104.

Referring back to FIG. 1, the memory cell array 101 is organized (e.g., divided) into multiple erase sectors 103. Memory cells 104 within the same erase sector 103 are erased at the same time (e.g., by the same erase operation). More details of the erase operation of the erase sector 103 are discussed hereinafter.

The NVM device 100 includes a controller 107, which may be or include, e.g., a micro-controller, an application-specific integrated circuit (ASIC) (or a portion of an ASIC), or the like. The controller 107 may have its own memory region(s) integrated within the controller 107, such as a non-volatile memory region for storing computer code for execution by the controller 107, and a volatile memory region (e.g., random access memory (RAM)) for storing, e.g., temporary results during execution of the stored computer code.

The controller 107 may communicate with the external controller 120 through the I/O circuit 109 (may also be referred to as an I/O interface). The I/O circuit 109 may include circuits for, e.g., shifting signal voltage levels (e.g., level shifting circuits) and/or circuits for adjusting signal driving capabilities (e.g., driver circuits, buffer circuits) to ensure signal compatibility between the controller 107 and the external controller 120.

In some embodiments, the controller 107 is coupled directly to the memory cell array 101, and coupled indirectly to the memory cell array 101 through the array access circuit 11. The array access circuit 11 includes circuits for generating the control signals for accessing (e.g., read, write) the memory cells 104 of the memory cell array 101. For example, the controller 107 may send the address of a memory cells 104 to be accessed to the array access circuit 111, and the array access circuit 111 translates the address into corresponding control signals (e.g. voltage signals) on the respective WL and BL to select the memory cell 104 to be accessed. In an embodiment, to read the digital bit stored in the selected memory cell 104, a voltage is applied between the source terminal and the drain terminal of the transistor of the selected memory cell 104, and the current flowing through the source and drain terminals is measured and/or compared with a reference current to determine whether a "0" or a "1" is stored in the selected memory cell. The controller 107 may also perform an encoding process using an error-correction code (ECC) to generates redundant bits (may also be referred to as ECC bits, parity bits, or parity check bits) for the data or metadata to be stored in an erase sector, and may also perform a decoding process (e.g., error detection/error correction) for the data or metadata previously stored in the erase sector, details are discussed hereinafter.

In some embodiments, when programming (e.g., writing) or reading the memory cells 104, the memory cells 104 may be addressed individually. Once the memory cells 104 are programmed, the memory cells 104 may need to be erased by an erase operation before the memory cells 104 can be programmed again with new values. In the illustrated embodiment, the erase operation is performed on a block basis (e.g., for an entire erase sector). In other words, all of the memory cells 104 in the same erase sector 103 are erased by a same erase operation.

During the erase operation for an erase sector, if there is a power loss, the erase operation may not be completed successfully, which may leave the memory cells 104 in the erase sector 103 in unknown or un-predictable states. If a subsequent programming (e.g., writing) of the memory cells 104 in the erase sector is performed without properly erasing the erase sector first, the memory cells 104 in the erase sector may not be programmed correctly. To overcome the challenge of power loss during the erase operation, an erase power-loss indicator (EPLI) is stored in the erase sector. In some embodiments, the EPLI includes a plurality of bits and have a pre-determined (e.g., known) bit pattern. If the bits of the EPLI (also referred to as EPLI bits) stored in an erase sector match the known bit pattern, then it is considered that the erase sector did not suffer a power loss event during the last erase operation and was completed successfully. Conversely, if the EPLI bits do not match the known bit pattern, then it is assumed that the last erase operation of the erase sector suffered a power loss and was not completed successfully, in which case another erase operation may be performed for the erase sector before the erase sector is programmed.

In some embodiments, at the beginning of the erase cycle of the erase operation, the memory controller 107 first destroys the EPLI bits by overwriting the EPLI with, e.g., all zeros or all ones such that the stored EPLI bits no longer match the known bit pattern of EPLI. Then, other operations (e.g., erasing all memory cells in the erase sector) of the erase cycle are performed. At the last step of the erase cycle, the memory controller 107 writes back the correct, known bit pattern into the EPLI bits of the erase sector to indicate a successful erase cycle. Therefore, if a power loss event happens before the erase cycle is completed successfully (e.g., missing the last step of writing back the correct, known bit pattern into the EPLI bits), the EPLI bits stored in the erase sector will have the wrong bit pattern.

In some embodiments, each erase sector 103 has a respective metadata 105, which includes many metadata bits. The metadata 105 includes the EPLI indicator and other parameters, such as a cycle counter (may also be referred to as erase cycle counter, or a counter) that indicates the total number of erase cycles that have been performed for the erase sector. In some embodiments, the performance and reliability of the memory cells 104 may slowly degrade after each erase cycle, and therefore, the memory cells 104 may have a limited life expectancy in terms of erase cycles. The value of the cycle counter for each erase sector therefore indicates the performance, reliability, and/or remaining life expectancy of the memory cells 104 in the erase sector 103, and may be used to adjust the control signals (e.g., voltage levels for the MLs and BLs) and/or reference signal levels (e.g., reference current value for determining the value of the bit(s) stored in the memory cell 104 during a read operation) for the memory cells 104 to compensate for the performance and reliability degradation.

Besides the EPLI indicator and the cycle counter, the metadata 105 of an erase sector 103 may include other parameters, such as an erase pulse counter, a data type/configuration indicator, and a sector status indicator. In some embodiments, the erase pulse counter indicates the number of erase pulses that were required to erase the erase sector previously, and therefore, may be used as an indication of the performance/condition of the erase sector. The data type/configuration indicator indicates the data type or data configuration of the data stored in the erase sector. For example, the data type/configuration indicator may indicate if the erase sector is used to store a specific registration information or if the data in the erase sector is arranged in a specific physical configuration. The sector status indicator indicates if the erase sector is active or non-active, as an example.

FIG. 1 shows the bits of the metadata 105 (also referred to as metadata bits) of an erase sector 103. As illustrated in FIG. 1, the metadata bits may be stored in any suitable locations within the erase sector, such as in memory cells not used to store the data of the erase sector 103. Note that in the discussion herein, distinction is made between the data of the erase sector 103 and the metadata of the erase sector 103. The data of the erase sector 103 are user data stored by, e.g., the external controller 120 in the NVM device 100 and are generated outside the NVM device 100, whereas the metadata 105 are system information generated by the NVM device 100 internally for ensuring proper operation of the NVM device 100. For ease of discussion, the erase sector 103 may be conceptionally considered as having a data section that stores the data (e.g., user data) and having a metadata section that stores the metadata.

Figure 9:
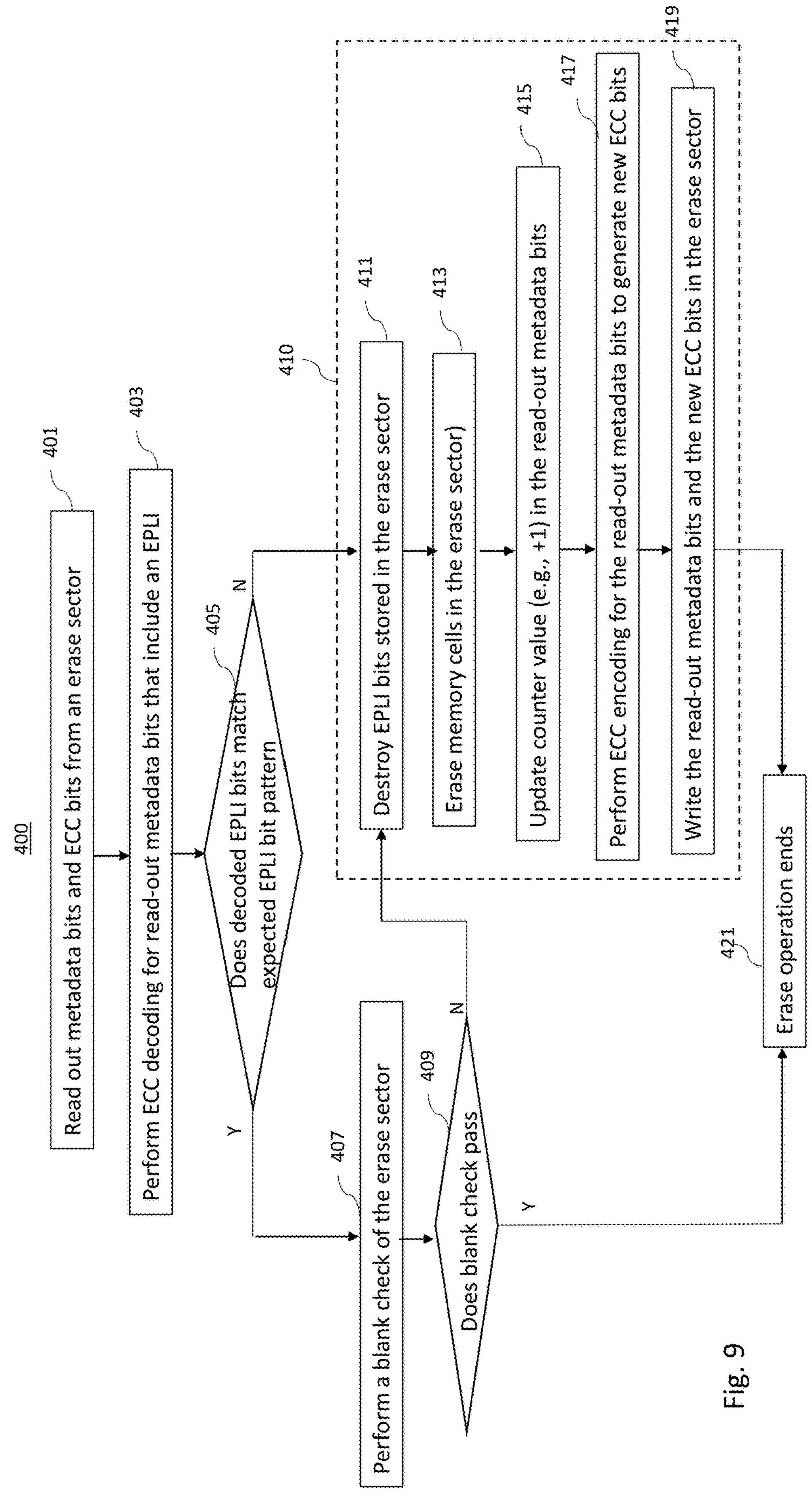
FIG. 9 illustrates a flow chart of an erase operation of an erase sector, in an embodiment.

In some embodiments, error-correction coding is used to protect the data of the erase sector 103. The example of FIG. 2B illustrates the logic arrangement of memory cells for storing ECC protected data along a word line (WL) of an erase sector 103 of the memory cell array 101. The number of memory cells for storing data (also referred to as data memory cells) along a WL may be, e.g., 2048, and the data memory cells along the WL may be divided into a plurality of segments (may also be referred to as cache lines), where each segment (e.g., each cache line) includes, e.g., 128 bits of data stored in 128 data memory cells. An error-correction code (ECC) may be used to encode the data in each segment and to generate redundant bits for the segment of data. A suitable error-correction code, such as a Hamming code (e.g., a systematic Hamming code), may be used to generate the redundant bits. As skilled artisans readily appreciate, the ECC encoder receives the bits to be protected (also referred to as a message), and generates (e.g., outputs) a code word which has more bits (thus adding redundancy for error detection/correction) than the message. The code word generated by a systematic ECC includes the original message and additional redundant bits generated by the systematic ECC. In the example of FIG. 2B, 9 redundant bits are generated for each segment of 128 bits of data by a systematic ECC, and are stored in metadata memory cells (e.g., memory cells for storing metadata) corresponding to the segment of 128 bits of data.

In some embodiments, the memory controller 107 performs error-correction coding for the data of the erase sector 103 during programming (e.g., writing) of the memory cells in the erase sector 103, and also performs error detection/error correction during reading of the memory cells in the erase sector 103. The memory controller 107 may execute computer code stored in the memory region of the memory controller 107 to function as the ECC encoder/decoder.

As discussed above, the metadata 105 of the erase sector 103 are used to ensure proper operation of the NVM device 100. While it may be advantageous to protect the metadata 105 of the erase sector 103 using ECC, the metadata 105 in current NVM devices may not be protected, may be protected by weak ECCs (e.g., ECCs that have weak error detection/correction capability), or may require large number of memory cells to store the ECC coded data if a strong ECC encoding method is employed. In addition, since the metadata 105 of the erase sector 103 may have a different data structure (e.g., length) than the data in each cache line, in some current NVM devices, different ECC encoders are used (e.g., one for protecting the cache line data, and another one for protecting the metadata) for protecting the metadata 105 and data in the cache line, which increases the complexity of the NVM devices. The present disclosure discloses a simple, flexible method that offers the same level of protection for the metadata 105 as the data in the erase sector with low area cost (e.g., low number of memory cells to store ECC bits), details are discussed hereinafter.

Figures 3A, 3B, 3C:
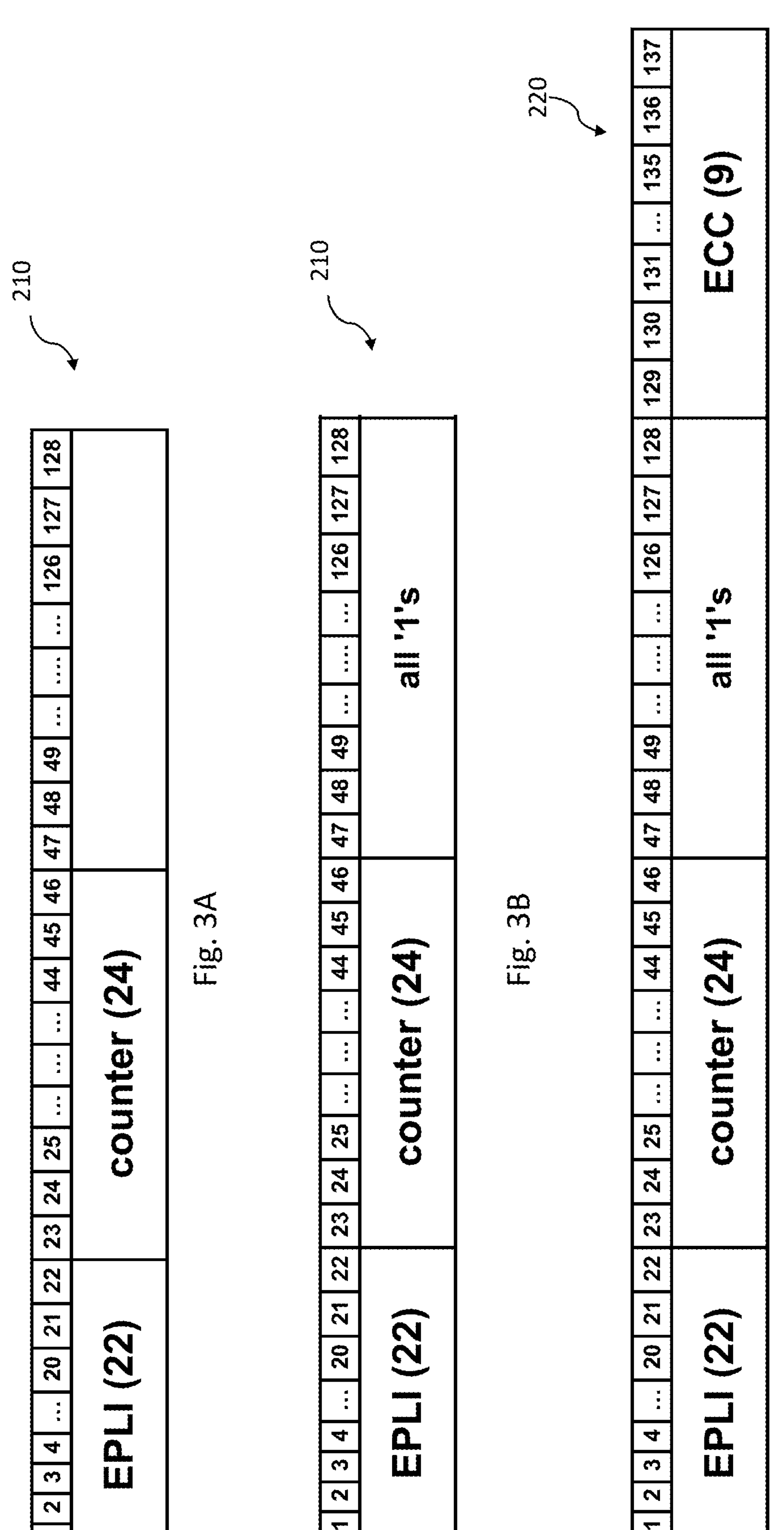
FIGS. 3A-3C illustrate an encoding process of metadata bits of an erase sector using an error-correction code, in an embodiment.

FIGS. 3A-3C illustrate an encoding process of some metadata bits of an erase sector using an error-correction code, in an embodiment. In the example of FIGS. 3A-3C, the EPLI indicator (which has 22 bits) and the cycle counter (which has 24 bits) of the metadata 105 are protected by the same ECC used for protecting the data of the erase sector 103. Note that in the illustrated embodiment of FIGS. 3A-3C, the ECC is a systematic ECC (e.g., a systematic Hamming code), which expects to receive a message (e.g., bits to be encoded) having 128 bits, and generates an output (referred to as a code word) having 137 bits (which includes the 128 bits from the message and 9 redundant bits generated by the ECC).

In FIGS. 3A-3C, in order to use the ECC to encode the 46 metadata bits from the EPLI indicator and the cycle counter, dummy bits are used to pad the metadata bits to form a message 210 (also referred to as a 128-bit data frame) that has 128 bits. As illustrated in FIG. 3A, the 22 metadata bits from the EPLI indicator and the 24 metadata bits from the cycle counter fill the first 46 bits of the message 210. Then, in FIG. 3B, 82 dummy bits fill the remainder of the message 210. The dummy bits may be, e.g., all ones or all zeros, as an example. As another example, the dummy bits may be any pre-determined data pattern, such as a bit sequence with alternating zeros and ones (e.g., 0101 . . . ), a bit sequence with alternating ones and zeros (e.g., 1010 . . . ), or a random bit sequence generated with ones and zeros at random locations. The random bit sequence, once generated, is saved as a pre-determined bit sequence and is known to the ECC encoder/decoder (e.g., saved in the memory region of the controller 107). In FIG. 3C, an encoding process is performed by the memory controller 107 using the systematic ECC, the 9 redundant bits (denoted as ECC (9) in FIGS. 3C and 4) generated by the systematic ECC is shown in FIG. 3C after the 128-bit message. Therefore, the 128-bit message and the 9 redundant bits in FIG. 3C together illustrate a code word 220 (e.g., having 137 bits) generated by the systematic ECC.

An example is given below using a Hamming code (e.g., a systematic Hamming code) as the ECC to illustrate generation of the redundant bits to offer ECC protection for the metadata bits. Denote the message (e.g., the 128-bit data frame that includes the metadata bits and dummy bits) as a vector m, where m is a binary row vector of length k. Denote the generator matrix G of the Hamming code as:

$$G = (I_k | A^T) \tag{1}$$

where $I_k$ is an identity matrix of size k, A is a matrix of dimension (n−k) by k, and T denotes the transpose operation. The code word C (e.g., output) of the Hamming code is generated by:

$$C = m \times G \tag{2}$$

where the code word C is a row vector of length n. In the example of FIGS. 3A-3C, k=128, and n=137. Note that as discussed above, the data of the erase sector are also encoded using the same ECC code in the illustrated embodiments. For example, a message can be formed by taking 128 bits of the data of the erase sector, then encoding the message using Equation (2).

Due to the identity matrix $I_k$ in the generator matrix G of the Hamming code, the Hamming code in the above example is a systematic code. Therefore, the code word C generated by the Hamming code includes the original message (which has k bits) followed by the redundant bits (which has n−k bits).

Figure 4:
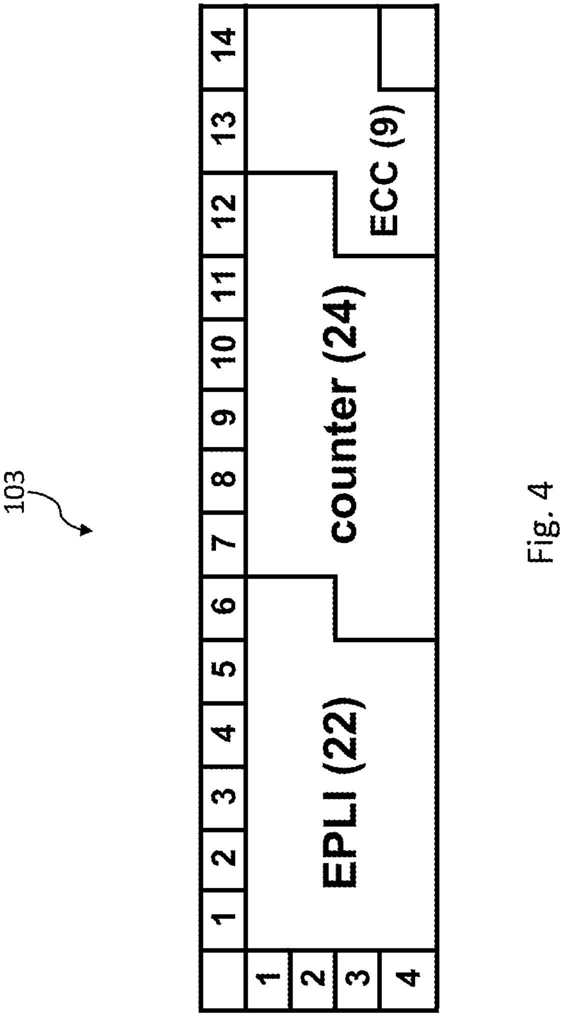
FIG. 4 illustrates storage of the metadata bits and the corresponding redundant bits of FIG. 3C in an erase sector, in an embodiment.

FIG. 4 illustrates storage of the metadata bits and the corresponding redundant bits of FIG. 3C in an erase sector 103, in an embodiment. Note that since the dummy bits are known to the ECC encoder/decoder, there is no need to store the dummy bits. As illustrated in FIG. 4, the 9 redundant bits (e.g., ECC bits) are stored in the erase sector after the EPLI indicator and the cycle counter. In the example of FIG. 4, four WLs and 14 BLs are shown to represent a portion of the erase sector 103 (which includes 56 memory cells for storing 56 bits) that is used to store the EPLI indicator, the cycle counter, and the corresponding redundant bits.

In FIG. 4, the 46 metadata bits for the EPLI indicator and the cycle counter, as well as the 9 redundant bits, are stored column-wise in the portion of the erase sector 103. In other words, the metadata bits and the redundant bits fill the first column of the portion of the erase sector 103 in FIG. 3B, then fill the next column, and so on, until all bits are stored. Since only 9 redundant bits are stored in addition to the metadata bits, the disclosed method herein achieves strong ECC protection for the metadata bits with negligible area penalty (e.g., needs little extra storage space for storing the redundant bits).

After the metadata bits and the redundant bits are stored in the erase sector 103, when the metadata bits are read subsequently, ECC decoding may be performed to determine whether error has occurred in the stored metadata bits. If error is detected by the ECC decoding process, error correction is performed to correct the error. If the number of bit errors is within the error correction capability of the ECC code, the error in the metadata bits is corrected. Since the ECC code generally is able to correct multiple bits errors in the code word, and since the likelihood of the code word having more bit errors than the error correction capability of the ECC is very low, the decoded metadata bits may be considered error free, in some embodiments.

Figures 5A, 5B, 5C:
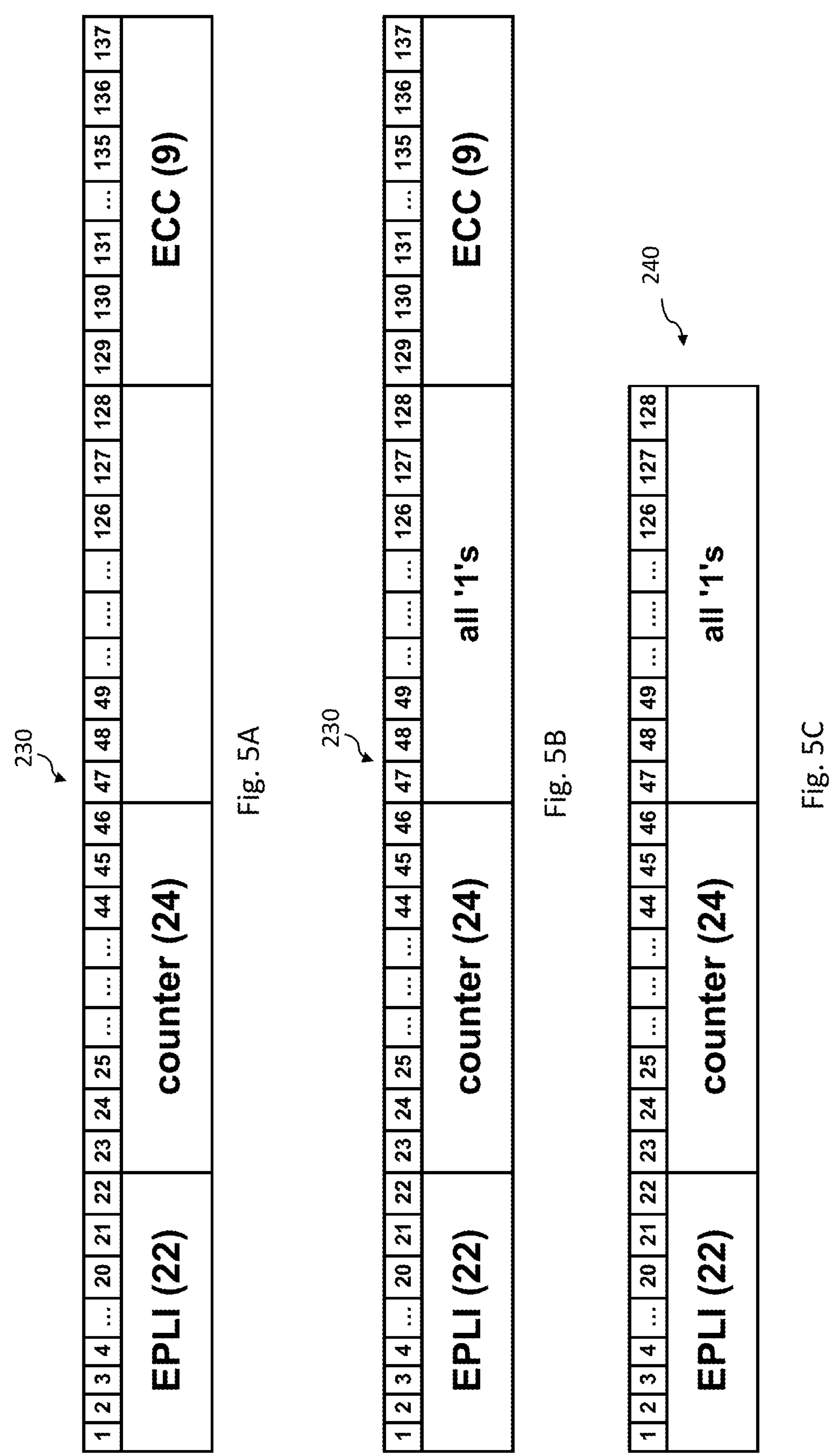
FIGS. 5A-5C illustrate a decoding process of metadata bits stored in an erase sector, in an embodiment.

FIGS. 5A-5C illustrate a decoding process of the metadata bits of FIG. 4 stored in an erase sector, in an embodiment. To perform ECC decoding, the stored metadata bits (e.g., 22 EPLI metadata bits and 24 cycle counter metadata bits) and the stored redundant bits (e.g., 9 ECC bits) in the erase sector are read out, and are used to fill portions of a data frame 230 (e.g., a 137-bit data frame), as illustrated in FIG. 5A. Next, in FIG. 5B, the dummy bits (e.g., the same dummy bits used in FIG. 3B during the ECC encoding process) fills the rest of the 137-bit data frame. The positions of the metadata bits, the redundant bits, and the dummy bits in FIG. 5B should match those in FIG. 3C. Note that unlike the metadata bits and the redundant bits, the dummy bits are not read from the erase sector, and instead, are filled with the known, pre-determined data pattern (e.g., all ones, all zeros, or a pre-determined bit sequence) used during the ECC encoding. Once completely filled, the frame 230 represents a code word 230 that is ready to be sent to the ECC decoder. Next, in FIG. 5C, the memory controller 107 performs the ECC decoding process for the code word 230, and generate a decode message 240 that includes decoded metadata bits (e.g., decoded EPLI metadata bits and decoded cycle counter metadata bits). For example, the code word 230 is processed by the ECC decoder for error detection/error correction. If error is detected in the code word 230, the ECC decoder corrects the error.

For the above example using Hamming code, the ECC decoding process may be performed by calculating a syndrome vector S by:

$$S = C \times H^T = C \times (A | I_{n-k})^T \tag{3}$$

where S is a row vector of length n−k, $H=(A|I_{n-k})$ is the parity check matrix, $H \times G^T=0$, and $I_{n-k}$ is an identity matrix of size n−k.

Due to the orthogonality between the parity check matrix H and the generator matrix G, if there is no error in the code word (which contains the stored metadata bits), the syndrome vector S is a zero vector (e.g., having all zero elements). A non-zero syndrome vector S indicates error in the code word. Error correction may be performed by using a syndrome look-up-table (LUT). The syndrome LUT stores a list of non-zero syndrome vectors S and the corresponding error pattern for each of the non-zero syndrome vectors S. Error correction may be performed by finding the matching non-zero syndrome vector S in the syndrome LUT, and correcting the code word using the corresponding error pattern (e.g., by perform an XOR operation between the corresponding binary error pattern and the code word). The syndrome LUT may be stored in one of the memory regions of the controller 107, as an example.

As discussed above, the memory controller 107 may function as the ECC encoder and the ECC decoder. During ECC encoding, the data frame (e.g., the 128-bit data frame) for storing the message may be formed in one of the memory regions (e.g., a RAM region) of the memory controller 107, in some embodiments. Similarly, during ECC decoding, the memory controller 107 may read the stored metadata bits and the stored redundant bits from the erase sector, then perform dummy bits padding to form the code word (e.g., the 137-bit data frame) for decoding. The code word may be stored in one of the memory regions (e.g., a RAM region) of the memory controller 107.

Variations to the disclosed embodiments are possible and are fully intended to be included within the scope of the present disclosure. In the example of FIG. 4, the indices of the WLs and BLs start from 1. This is, of course, merely a non-limiting example. The indices of the WLs and BLs may start from any reasonable value, as skilled artisans readily appreciate. In addition, storage of the metadata bits and the redundant bits in the erase sector may be performed along a row-wise direction (see FIG. 8), instead of along a column-wise direction as illustrated in FIG. 4. In addition, the metadata bits and the corresponding redundant bits do not have to be stored in contiguous regions of the erase sector, and instead, may be stored in separate regions of the erase sector, as long as the ECC encoder/decoder knows the locations of the metadata bits and the corresponding redundant bits. In the example of FIGS. 3A-3C, the metadata bits from the EPLI indicator and the cycle counter are protected by ECC. Other metadata bits, and/or other combinations of the metadata bits may also be protected by ECC. Furthermore, while Hamming code is used as an example of the ECC, other suitable ECC, such as Reed-Solomon code, BCH code, or the like, may also be used as the ECC, and may provide stronger ECC protection. These and other variations are fully intended to be included within the scope of the present disclosure.

FIGS. 6A-6B and 7A-7B illustrate encoding processes of first metadata bits (e.g., EPLI metadata bits) and second metadata bits (e.g., cycle counter metadata bits) of an erase sector, respectively, in an embodiment. Note that unlike the example in FIG. 3A-3C, where the metadata bits from the EPLI indicator and the cycle counter of an erase sector are packed into the same data frame for ECC encoding, in the example of FIGS. 6A-6B and 7A-7B, the metadata bits from the EPLI indicator are encoded separately from the metadata bits from the cycle counter of the same erase sector.

Figures 6A, 6B:
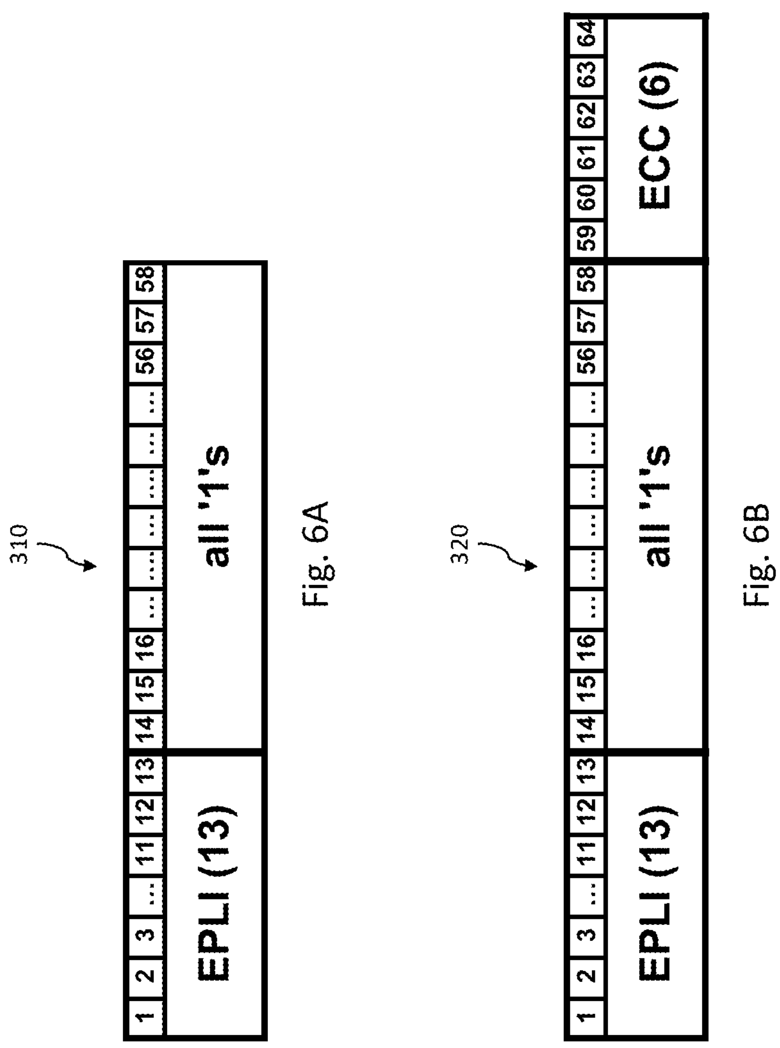
FIGS. 6A-6B and 7A-7B illustrate encoding processes of first metadata bits and second metadata bits of an erase sector, respectively, in an embodiment.

In the example of FIG. 6A, the metadata bits from the EPLI indicator are packed into a message 310 (e.g., a 58-bit data frame) for ECC encoding. The metadata bits of the EPLI indicator have 13 bits and fill the first 13 bits of the 58-bit data frame, while dummy bits (e.g., all ones or all zeros) fill the remainder of the 58-bit data frame. The ECC used may be, e.g., a systematic Hamming code that receives a message having 58 bits, and generates 6 redundant bits (denoted as ECC(6) in FIG. 6B) to form a code word 320. As shown in FIG. 6B, the code word 320 includes the message 310 and the 6 redundant bits generated for the message 310.

Figures 7A, 7B:
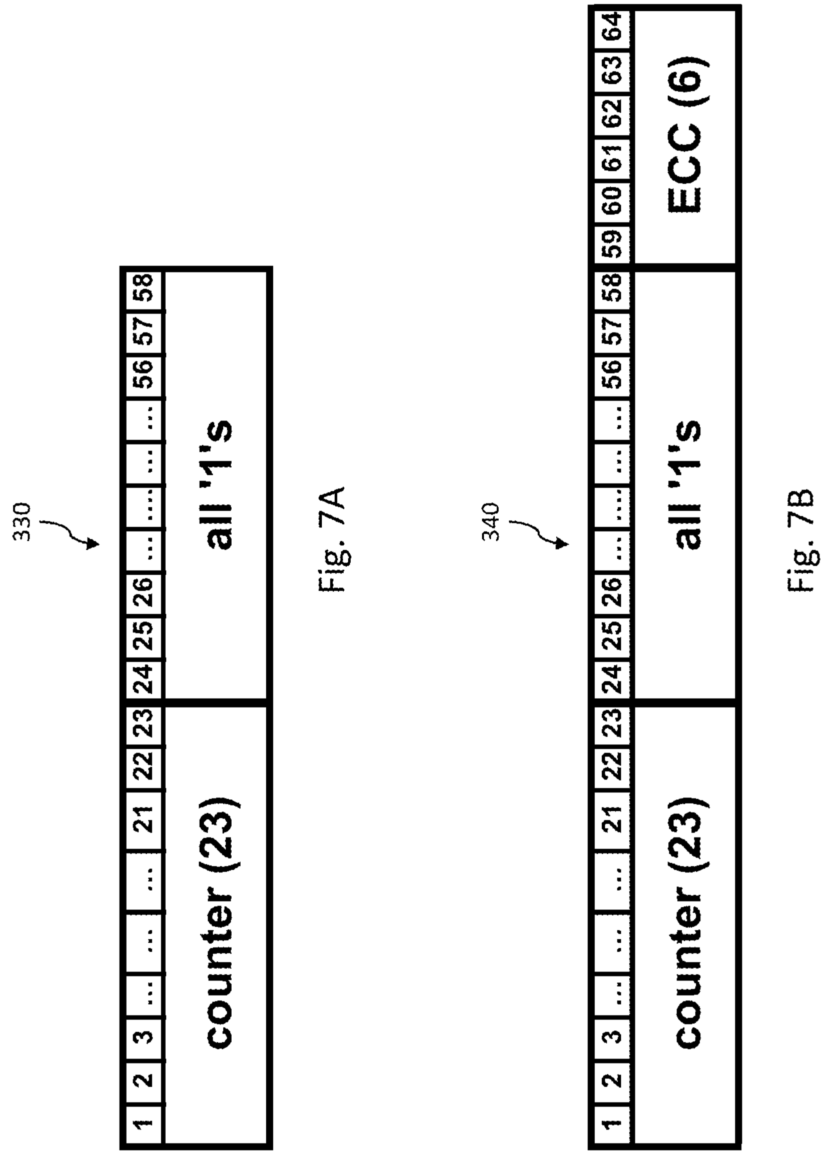

Similarly, in FIG. 7A, the metadata bits from the cycle counter are packed into a message 330 (e.g., a 58-bit data frame) for ECC encoding. The metadata bits of the cycle counter have 23 bits and fill the first 23 bits of the 58-bit data frame, while dummy bits (e.g., all ones or all zeros) fill the remainder of the 58-bit data frame. The ECC used is the same as the ECC used in FIGS. 6A-6B, which is also the ECC used for encoding the data of the erase sector. FIG. 7B shows the code word 340 generated by the ECC encoder, which includes the message 330 and the 6 redundant bits (denoted as ECC(6) in FIG. 7B) generated for the message 330.

Figure 8:
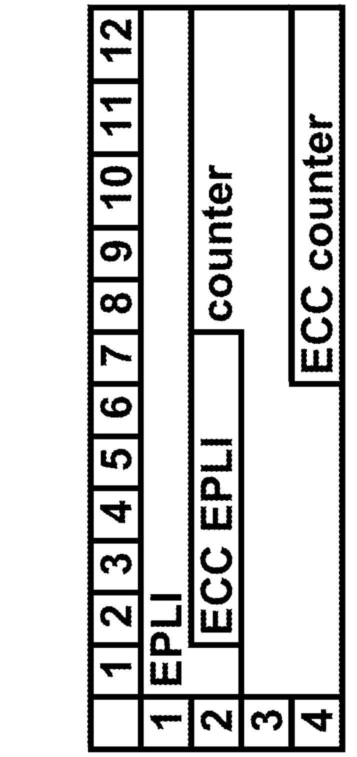
FIG. 8 illustrates storage of the first metadata bits, the second metadata bits, and the corresponding redundant bits of FIGS. 6B and 7B in an erase sector, in an embodiment.

FIG. 8 illustrates storage of the first metadata bits, the second metadata bits, and the corresponding redundant bits of FIGS. 6B and 7B in an erase sector, in an embodiment. Similar to FIG. 4, the dummy bits are not stored in the erase sector, since the dummy bits are known to the ECC encoder/decoder. In the example of FIG. 8, the metadata bits of the EPLI, the redundant bits of the EPLI indicator (denoted as ECC EPLI), the metadata bits of the cycle counter, and the redundant bits of the cycle counter (denoted as ECC counter) are stored in a portion of the erase sector 103 defined by 4 WLs and 12 BLs. Note that the metadata bits and the redundant bits are stored in FIG. 8 in a row-wise direction, instead of the column-wise direction in FIG. 4. Since only the redundant bits are stored in the erase sector, strong ECC protection is achieved within little area penalty.

Error detection/correction for the stored metadata bits in FIG. 8 can be performed by performing the ECC decoding process. Details are similar to those discussed above, thus may not be repeated. For example, the stored metadata bits of the EPLI indicator, the dummy bits, and the stored redundant bits for the EPLI indicator may form a first code word (e.g., a first 64-bit data frame as shown in FIG. 6B), and the first code word is processed by the ECC decoder for error detection/correction for the EPLI indicator. Similarly, the stored metadata bits of the cycle counter, the dummy bits, and the stored redundant bits for the cycle counter may form a second code word (e.g., a second 64-bit data frame as shown in FIGS. 7B), and the second code word is processed by the ECC decoder for error detection/correction for the cycle counter.

FIG. 9 illustrates a flow chart of an erase operation 400 of an erase sector, in an embodiment. The erase operation 400 may illustrate processing performed by the NVM device 100 in response to an erase command of an erase sector. The erase operation 400 illustrates an example where the ECC encoding process and ECC decoding process discussed above are used. Besides the erase operation 400, the ECC encoding and decoding processes may be used for other purposes or applications, as skilled artisans readily appreciate.

Referring to FIG. 9, at block 401, metadata bits and redundant bits (also referred to as ECC bits) for the metadata bits, which are stored in the erase sector, are read out. In an example embodiment, the metadata bits and the ECC bits stored in the erase sector are read out and stored temporarily, e.g., in the memory region of the memory controller 107. Next, at block 403, ECC decoding process is performed for the read-out metadata bits. Note that in some embodiments, only some of the metadata bits (e.g., metadata bits for EPLI and cycle counter) are protected by the ECC bits, while other metadata bits are not protected by the ECC bits. Therefore, the ECC decoding is performed for the ECC-protected metadata bits, e.g., using ECC decoding process same as or similar to those discussed above. In the illustrated embodiment, the ECC-protected metadata bits include metadata bits for the EPLI. In some embodiments, all of the metadata bits of the erase sector are protected by the ECC bits.

Next, at block 405, the decoded EPLI bits are compared with a known, expected bit pattern for EPLI. If the decoded EPLI bits match the known, expected bit pattern for EPLI, it is considered that no power loss event happened in the previous erase cycle. If, however, there is a mismatch between the decoded EPLI bits and the known, expected bit pattern for EPLI, it is considered that a power loss event happened in the previous erase cycle, and as a result, a new erase cycle should be performed for the erase sector. The processing steps within the dashed box in FIG. 9 are collectively referred to as an erase cycle 410. Details of the erase cycle 410 are discussed hereinafter.

When the decoded EPLI bits match the known, expected bit pattern for EPLI, the processing goes to block 407, where a blank check of the erase sector is performed. In some embodiments, the blank check is performed by reading all of the data stored in the data section of the erase sector, and comparing the data in the data section with an expected value (e.g., a bit "1"). If all of the data stored in the data section of the erase sector have the expected value (e.g., "1"), the blank check is considered a pass; otherwise, the blank check is considered a fail.

Next, in block 409, if the blank check is a pass, the processing goes to block 421, where the erase operation ends. This obviates an erase cycle for the erase sector, which not only saves processing time, but also improves the life expectancy of the NVM device. If the blank check is a fail, the processing goes to block 411 to start an erase cycle for the erase sector. Details of the erase cycle 410 are discussed below.

As the start of the erase cycle, in block 411, the EPLI bits stored in the erase sector are destroyed, e.g., by overwriting the EPLI bits with all zeros, such that the EPLI bits are now different from the known, expected bit pattern for EPLI. Next, in block 413, the erase sector is erased by an erase process. The erasure process may be specific to the type of memory cells in the NVM device, and may be system and implementation specific. In one embodiment, the erasure process is performed by writing a value of, e.g. "1" in all of the memory cells of the erase sector.

Next, in block 415, the value of the cycle counter in the read-out metadata bits, which may be stored in the memory region of the memory controller 107, is incremented by 1. Next, in block 417, ECC encoding is performed for the metadata bits which were previously protected by ECC bits to generate new ECC bits for the metadata bits. The ECC encoding process may be same as or similar to those discussed above. In some embodiments, before the ECC encoding process is performed, the decoded EPLI bits are replaced with the known, expected EPLI bit pattern. This ensures that the new EPLI bits written back in the erase sector are correct.

Next, in block 419, the read-out metadata bits, which includes the updated cycle counter, the EPLI bits, and other metadata bits, as well as the new ECC bits, are written back into their original locations in the erase sector. In some embodiments, the EPLI bits are the last bits to be written back into the erase sector. After the erase cycle is complete, the processing goes to block 421, where the erase operation ends.

Figure 10:
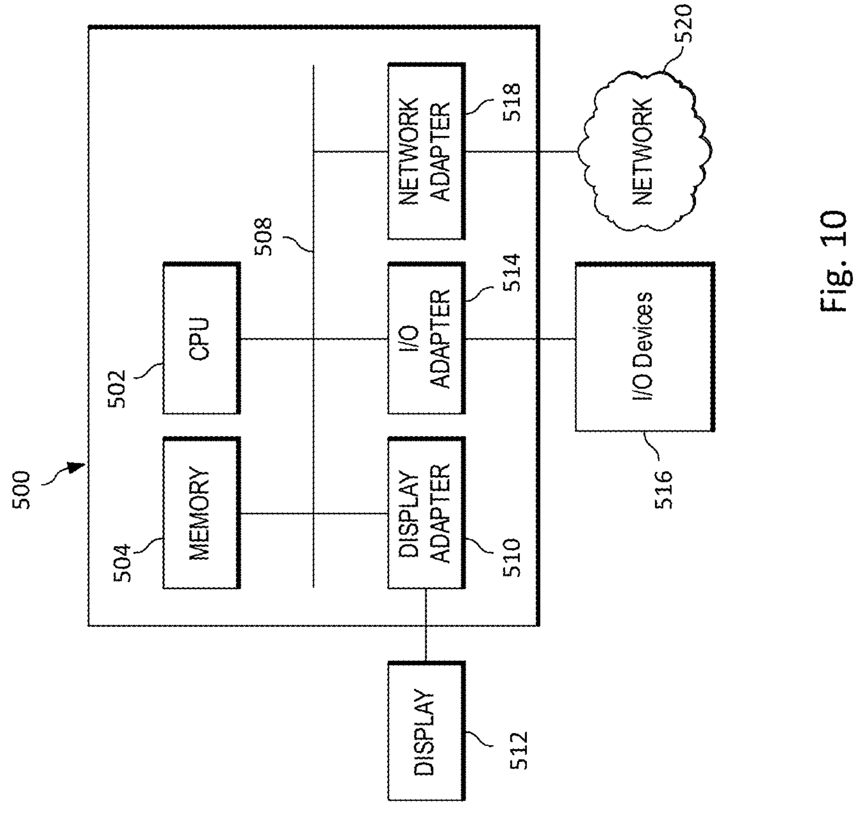
FIG. 10 illustrates a processing system that can be used to implement portions of embodiment systems, in an embodiment.

FIG. 10 illustrates a block diagram of a processing system 500 that can be used to implement portions of embodiment systems, in an embodiment. The processing system 500 depicts a general-purpose platform and the general components and functionality that may be used to implement portions of embodiments described herein. For example, the processing system 500, or portions thereof, may be used as the controller 107 in FIG. 1. The processing system 500 may be used to control access of the memory cell array 101, and to implement some or all of the processing related to ECC encoding and ECC decoding discussed above.

Processing system 500 may include, for example, a central processing unit (CPU) 502, and a memory 504 (which may include volatile memory region(s) and non-volatile memory regions) connected to a bus 508, and may be configured to perform the processing discussed above according to programmed instructions stored in the memory 504 or on other non-transitory computer readable media. The processing system 500 may further include, if desired or needed, a display adapter 510 to provide connectivity to a local display 512 and an input-output (I/O) adapter 514 to provide an input/output interface for one or more input/output devices 516, such as a mouse, a keyboard, flash drive or the like.

The processing system 500 may also include a network interface 518, which may be implemented using a network adaptor configured to be coupled to a wired link, such as a network cable, USB interface, or the like, and/or a wireless/cellular link for communications with a network 520. The network interface 518 may also comprise a suitable receiver and transmitter for wireless communications. It should be noted that the processing system 500 may include other components. For example, the processing system 500 may include hardware components such as power supplies, cables, a motherboard, removable storage media, cases, and the like if implemented externally. These other components, although not shown, may be considered part of the processing system 500. In some embodiments, processing system 500 may be implemented on a single monolithic semiconductor integrated circuit and/or on the same monolithic semiconductor integrated circuit as other disclosed system components.

Figure 11:
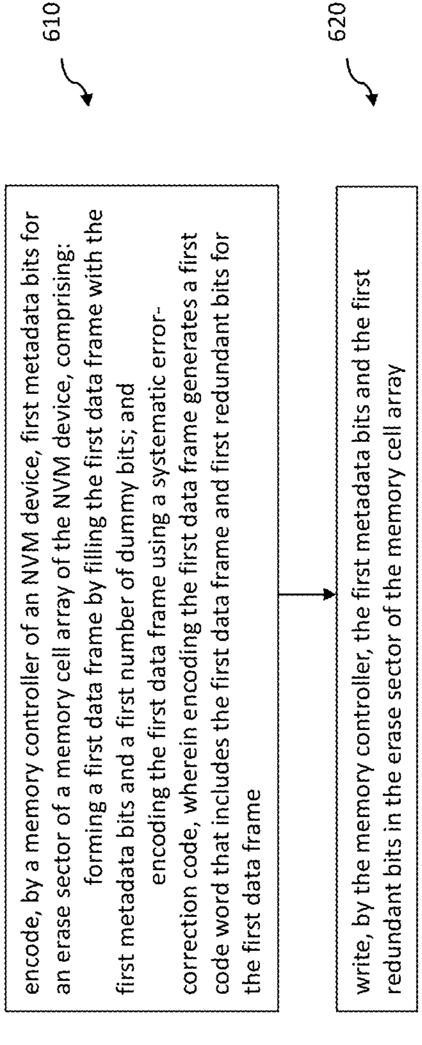
FIG. 11 illustrates a flow chart of a method of operating an NVM device, in an embodiment.

FIG. 11 illustrates a flow chart of a method 600 of operating an NVM device, in an embodiment. It should be understood that the embodiment method shown in FIG. 11 is merely an example of many possible embodiment methods. One of ordinary skill in the art would recognize many variations, alternatives, and modifications. For example, various steps as illustrated in FIG. 11 may be added, removed, replaced, rearranged, or repeated.

Referring to FIG. 11, at block **61*o*, a memory controller of an NVM device encodes first metadata bits for an erase sector of a memory cell array of the NVM device, which includes: forming a first data frame by filling the first data frame with the first metadata bits and a first number of dummy bits; and encoding the first data frame using a systematic error-correction code (ECC), wherein encoding the first data frame generates a first code word that includes the first data frame and first redundant bits for the first data frame. At block 620**, the memory controller writes the first metadata bits and the first redundant bits in the erase sector of the memory cell array.

Disclosed embodiments achieve various advantages. For example, the disclosed system and methods offer strong ECC protection for the metadata of the erase sector. The disclosed methods allow the same ECC to be used for protecting both the metadata bits and the user data stored in the erase sector, thus reducing implementation complexity of the ECC encoder/decoder used in the NVM device. Dummy bits are used to allow flexibility in choosing the number of metadata bits to be protected and the size of the data frame. Since only the redundant bits are stored in the erase sector without storing the dummy bits, the benefit of ECC protection is achieved with little expense in terms of memory cell usage.

Embodiments of the present invention are summarized here. Other embodiments can also be understood from the entirety of the specification and the claims filed herein.

Example 1. In an embodiment, a method of operating a non-volatile memory (NVM) device includes: reading, by a memory controller of the NVM device, first metadata bits and first redundant bits stored in an erase sector of a memory cell array of the NVM device, wherein the first redundant bits are generated using an error-correction code (ECC) for protection of the first metadata bits; and performing an ECC decoding process for the first metadata bits, comprising: forming a first data frame by filling the first data frame with the first metadata bits, a first number of dummy bits, and the first redundant bits; computing, by the memory controller, a syndrome vector for the first data frame in accordance with the error-correction code; and in response to determining that the syndrome vector comprises a non-zero element, performing, by the memory controller, error correction for the first data frame to obtain decoded first metadata bits.

Example 2. The method of Example 1, wherein the error-correction code is a systematic error-correction code.

Example 3. The method of Example 2, wherein the error-correction code is a systematic Hamming code.

Example 4. The method of Example 2, wherein the first metadata bits comprise an Erase Power-Loss Indicator (EPLI) of the erase sector.

Example 5. The method of Example 2, wherein the first number of dummy bits are all ones or all zeros.

Example 6. The method of Example 2, wherein the error-correction code is the same error-correction code used for protecting data bits stored in the erase sector.

Example 7. The method of Example 1, further comprising, after performing the ECC decoding process: performing an ECC encoding process for the decoded first metadata bits, comprising: forming a second data frame by filling the second data frame with the decoded first metadata bits and the first number of dummy bits; and encoding, by the memory controller, the second data frame using the error-correction code, wherein encoding the second data frame generates second redundant bits for the second data frame; and after performing the ECC encoding process, writing, by the memory controller, the decoded first metadata bits and the second redundant bits in the erase sector of the memory cell array.

Example 8. The method of Example 7, wherein the first metadata bits comprise an Erase Power-Loss Indicator (EPLI) of the erase sector, wherein the method further comprises, before encoding the second data frame, replacing the EPLI in the decoded first metadata bits with a pre-determined bit pattern for the EPLI.

Example 9. The method of Example 7, wherein the first metadata bits comprise a counter of the erase sector, wherein a value of the counter indicates a total number of erase cycles performed on the erase sector, wherein the method further comprises, before encoding the second data frame, incrementing the value of the counter by one.

Example 10. The method of Example 2, wherein performing the ECC decoding process further comprises: in response to determining that the syndrome vector comprises all zero elements, outputting, by the memory controller, the first metadata bits as the decoded first metadata bits.

Example 11. In an embodiment, a method of operating a non-volatile memory (NVM) device includes: encoding, by a memory controller of the NVM device, first metadata bits for an erase sector of a memory cell array of the NVM device, comprising: forming a first data frame by filling the first data frame with the first metadata bits and a first number of dummy bits; and encoding the first data frame using a systematic error-correction code (ECC), wherein encoding the first data frame generates a first code word that includes the first data frame and first redundant bits for the first data frame; and writing, by the memory controller, the first metadata bits and the first redundant bits in the erase sector of the memory cell array.

Example 12. The method of Example 11, wherein the systematic error-correction code is the same error-correction code used for protecting data bits stored in the erase sector.

Example 13. The method of Example 11, further comprising, after writing the first metadata bits and the first redundant bits in the erase sector: reading out, by the memory controller, the first metadata bits and the first redundant bits stored in the erase sector; and performing an ECC decoding process for the read-out first metadata bits, comprising: forming a second data frame by filling the second data frame with the read-out first metadata bits, the first number of dummy bits, and the read-out first redundant bits; computing, by the memory controller, a syndrome vector for the second data frame in accordance with the systematic error-correction code; and in response to determining that the syndrome vector comprises a non-zero element, performing, by the memory controller, error correction for the second data frame to obtain decoded first metadata bits.

Example 14. The method of Example 11, wherein the dummy bits comprise a pre-determined number of bits with a pre-determined bit pattern.

Example 15. The method of Example 11, wherein the systematic error-correction code is a systematic Hamming code.

Example 16. In an embodiment, a non-volatile memory (NVM) device includes: a memory cell array comprising a plurality of erase sectors, wherein each erase sector of the plurality of erase sectors is configured to store data bits and metadata bits of the each erase sector; an array access circuit coupled to the memory cell array and configured to perform read or write operations on the memory cell array; and a memory controller coupled to the memory cell array and the array access circuit, wherein the memory controller is configured to: encode first metadata bits for a first erase sector of the memory cell array by: forming a first data frame by filling the first data frame with the first metadata bits and a first number of dummy bits; and encoding the first data frame using a systematic error-correction code (ECC), wherein encoding the first data frame generates a first code word that includes the first data frame and first redundant bits for the first data frame; and write the first metadata bits and the first redundant bits in the first erase sector of the memory cell array.

Example 17. The NVM device of Example 16, wherein the dummy bits are all zeros or all ones.

Example 18. The NVM device of Example 16, wherein the systematic error-correction code is a systematic Hamming code.

Example 19. The NVM device of Example 16, wherein the memory controller is further configured to: read out the first metadata bits and the first redundant bits stored in the first erase sector; and perform an ECC decoding process for the read-out first metadata bits by: forming a second data frame by filling the second data frame with the read-out first metadata bits, the first number of dummy bits, and the read-out first redundant bits; computing a syndrome vector for the second data frame in accordance with the systematic error-correction code; and in response to determining that the syndrome vector comprises a non-zero element, performing error correction for the second data frame to obtain decoded first metadata bits.

Example 20. The NVM device of Example 19, wherein the first metadata bits comprise an Erase Power-Loss Indicator (EPLI) of the first erase sector, wherein the memory controller is further configured to, after performing the ECC decoding process, comparing the EPLI in the decoded first metadata bits with a pre-determined bit pattern for the EPLI.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method of operating a non-volatile memory (NVM) device, the method comprising:

encoding, by a memory controller of the NVM device, first metadata bits for an erase sector of a memory cell array of the NVM device, comprising:

forming a first data frame by filling the first data frame with the first metadata bits and a first number of dummy bits; and encoding the first data frame using a systematic error-correction code (ECC), wherein encoding the first data frame generates a first code word that includes the first data frame and first redundant bits for the first data frame;

writing, by the memory controller, the first metadata bits and the first redundant bits in the erase sector of the memory cell array;

reading out, by the memory controller, the first metadata bits and the first redundant bits stored in the erase sector; and performing an ECC decoding process for a read-out first metadata bits, comprising:

forming a second data frame by filling the second data frame with the read-out first metadata bits, the first number of dummy bits, and a read-out first redundant bits;

computing, by the memory controller, a syndrome vector for the second data frame in accordance with the systematic error-correction code; and in response to determining that the syndrome vector comprises a non-zero element, performing, by the memory controller, error correction for the second data frame to obtain decoded first metadata bits.

2. The method of claim 1, wherein the systematic error-correction code is the same error-correction code used for protecting data bits stored in the erase sector.

3. The method of claim 1, wherein the dummy bits comprise a pre- determined number of bits with a pre-determined bit pattern.

4. The method of claim 1, wherein the systematic error-correction code is a systematic Hamming code.

5. A non-volatile memory (NVM) device comprising:

a memory cell array comprising a plurality of erase sectors, wherein each erase sector of the plurality of erase sectors is configured to store data bits and metadata bits of the each erase sector;

an array access circuit coupled to the memory cell array and configured to perform read or write operations on the memory cell array; and a memory controller coupled to the memory cell array and the array access circuit, wherein the memory controller is configured to:

encode first metadata bits for a first erase sector of the memory cell array by:

forming a first data frame by filling the first data frame with the first metadata bits and a first number of dummy bits; and encoding the first data frame using a systematic error-correction code (ECC), wherein encoding the first data frame generates a first code word that includes the first data frame and first redundant bits for the first data frame;

write the first metadata bits and the first redundant bits in the first erase sector of the memory cell array;

read out the first metadata bits and the first redundant bits stored in the first erase sector; and perform an ECC decoding process for the read-out first metadata bits by:

forming a second data frame by filling the second data frame with the read-out first metadata bits, the first number of dummy bits, and the read-out first redundant bits;

computing a syndrome vector for the second data frame in accordance with the systematic error-correction code; and in response to determining that the syndrome vector comprises a non-zero element, performing error correction for the second data frame to obtain decoded first metadata bits.

6. The NVM device of claim 5, wherein the dummy bits are all zeros or all ones.

7. The NVM device of claim 5, wherein the systematic error-correction code is a systematic Hamming code.

8. The NVM device of claim 5, wherein the first metadata bits comprise an Erase Power-Loss Indicator (EPLI) of the first erase sector, wherein the memory controller is further configured to, after performing the ECC decoding process, comparing the EPLI in the decoded first metadata bits with a pre-determined bit pattern for the EPLI.

* * * * *